US011860758B2

(12) United States Patent
Hurley et al.

(10) Patent No.: US 11,860,758 B2
(45) Date of Patent: Jan. 2, 2024

(54) SYSTEM FOR ADJUSTING APPLICATION PERFORMANCE BASED ON PLATFORM LEVEL BENCHMARKING

(71) Applicant: Google LLC, Mountain View, CA (US)

(72) Inventors: Fergus Gerard Hurley, London (GB); Dino Derek Hughes, London (GB); Olivier Benoit Gaillard, London (GB); David Renaud Ghislain Chapelier, London (GB); Johannes Tonollo, London (GB); Simon James MacMullen, Warwickshire (GB); Yevhen Anisimov, London (GB); Ioannis Ilkos, London (GB); Benjamin Miles, London (GB)

(73) Assignee: Google LLC, Mountain View, CA (US)

( * ) Notice: Subject to any disclaimer, the term of this patent is extended or adjusted under 35 U.S.C. 154(b) by 546 days.

(21) Appl. No.: 16/978,574

(22) PCT Filed: Jun. 20, 2018

(86) PCT No.: PCT/US2018/038435
§ 371 (c)(1),
(2) Date: Sep. 4, 2020

(87) PCT Pub. No.: WO2019/216926
PCT Pub. Date: Nov. 14, 2019

(65) Prior Publication Data
US 2021/0019247 A1 Jan. 21, 2021

Related U.S. Application Data

(60) Provisional application No. 62/667,974, filed on May 7, 2018.

(51) Int. Cl.
G06F 11/00 (2006.01)
G06F 11/34 (2006.01)
(Continued)

(52) U.S. Cl.
CPC ...... *G06F 11/3428* (2013.01); *G06F 11/0793* (2013.01); *G06F 11/3051* (2013.01); *G06F 11/324* (2013.01); *G06F 11/3452* (2013.01)

(58) Field of Classification Search
CPC ............ G06F 11/0703; G06F 11/0706; G06F 11/0709; G06F 11/0715; G06F 11/0751;
(Continued)

(56) References Cited

U.S. PATENT DOCUMENTS 7,424,706 B2    9/2008  Ivanov et al.
2004/0003266 A1  1/2004  Moshir et al.
(Continued)

OTHER PUBLICATIONS

H. Zhu, Y. Zou and L. Zha, "VegaBench: A Benchmark Tool for Grid System Software," 2006 Fifth International Conference on Grid and Cooperative Computing Workshops, 2006, pp. 543-548, doi: 10.1109/GCCW.2006.99. (Year: 2006).*
(Continued)

*Primary Examiner* — Anthony J Amoroso
(74) *Attorney, Agent, or Firm* — Shumaker & Sieffert, P.A.

(57) ABSTRACT

A system is described that obtains first performance data collected during execution of a first application at a first group of computing devices, determines, based on the first performance data, at least one metric for quantifying performance of the first application, and compares the at least one metric to a corresponding benchmark derived from second performance data collected during execution of one or more second applications at a second group of computing devices. Each of the one or more second applications being different than the first application. The system determines whether the at least one metric is within a threshold amount of the corresponding benchmark, and further determines, determines, based at least in part on the at least one metric is not within the threshold amount of the corresponding
(Continued)

benchmark, a fix to the first application and outputs, for presentation at a developer device, an indication of the fix.

17 Claims, 4 Drawing Sheets

(51) Int. Cl.
*G06F 11/07* (2006.01)
*G06F 11/30* (2006.01)
*G06F 11/32* (2006.01)

(58) Field of Classification Search
CPC .............. G06F 11/0754; G06F 11/0766; G06F 11/0793; G06F 11/3003; G06F 11/3017; G06F 11/302; G06F 11/3051; G06F 11/3055; G06F 11/3058; G06F 11/324; G06F 11/32; G06F 11/328; G06F 11/34; G06F 11/3409; G06F 11/3428; G06F 11/3452; G06F 11/3466; G06F 2201/81; G06F 2201/865
See application file for complete search history.

(56) References Cited

U.S. PATENT DOCUMENTS

| | | | | |
|---|---|---|---|---|
| 2005/0278703 | A1* | 12/2005 | Lo ................... | H04L 41/5032 717/169 |
| 2009/0144584 | A1* | 6/2009 | Rowles .............. | G06F 11/0793 714/25 |
| 2012/0290870 | A1* | 11/2012 | Shah .................. | H04W 12/35 714/E11.073 |
| 2014/0282422 | A1 | 9/2014 | Tuffs et al. | |
| 2015/0227412 | A1 | 8/2015 | Carmel et al. | |
| 2016/0254943 | A1* | 9/2016 | Maes .................. | H04L 41/06 709/224 |
| 2017/0004155 | A1 | 1/2017 | Crasso et al. | |
| 2017/0315897 | A1 | 11/2017 | Brooks et al. | |
| 2018/0314576 | A1* | 11/2018 | Pasupuleti .......... | G06F 11/0754 |

OTHER PUBLICATIONS

P. Oliveira, M. T. Valente, A. Bergel and A. Serebrenik, "Validating metric thresholds with developers: An early result," 2015 IEEE International Conference on Software Maintenance and Evolution (ICSME), 2015, pp. 546-550, doi: 10.1109/ICSM.2015.7332511. (Year: 2015).*
Fuad, Mohammad Muztaba, Debzani Deb, and Jinsuk Baek. "Self-healing by means of runtime execution profiling." In 14th International Conference on Computer and Information Technology (ICCIT 2011), pp. 202-207. IEEE, 2011. (Year: 2011).*
V. Soundararajan, B. Agrawal, B. Herndon, P. Sethuraman and R. Taheri, "Benchmarking a virtualization platform," 2014 IEEE International Symposium on Workload Characterization (IISWC), 2014, pp. 99-109, doi: 10.1109/IISWC.2014.6983049. (Year: 2014).*
R. Gioiosa, G. Kestor and D. J. Kerbyson, "Online Monitoring System for Performance Fault Detection," 2014 IEEE International Parallel & Distributed Processing Symposium Workshops, 2014, pp. 1475-1484, doi: 10.1109/IPDPSW.2014.165. (Year: 2014).*
G. Cong et al., "A Systematic Approach toward Automated Performance Analysis and Tuning," in IEEE Transactions on Parallel and Distributed Systems, vol. 23, No. 3, pp. 426-435, Mar. 2012, doi: 10.1109/TPDS.2011.189. (Year: 2012).*
M. Sahasrabudhe, M. Panwar and S. Chaudhari, "Application performance monitoring and prediction," 2013 IEEE International Conference on Signal Processing, Computing and Control (ISPCC), 2013, pp. 1-6, doi: 10.1109/ISPCC.2013.6663466. (Year: 2013).*
A. Yamashita, "Experiences from performing software quality evaluations via combining benchmark-based metrics analysis, software visualization, and expert assessment," 2015 IEEE International Conference on Software Maintenance and Evolution (ICSME), 2015, pp. 421-428, doi: 10.1109/ICSM.2015.7332493. (Year: 2015).*
A. Pandey, L. Vu, V. Puthiyaveettil, H. Sivaraman, U. Kurkure and A. Bappanadu, "An Automation Framework for Benchmarking and Optimizing Performance of Remote Desktops in the Cloud," 2017 International Conference on High Performance Computing & Simulation (HPCS), 2017, pp. 745-752 (Year: 2017).*
G. A. D. Vale and E. M. L. Figueiredo, "A Method to Derive Metric Thresholds for Software Product Lines," 2015 29th Brazilian Symposium on Software Engineering, 2015, pp. 110-119, doi: 10.1109/SBES.2015.9. (Year: 2015).*
A. Papaioannou and K. Magoutis, "An Architecture for Evaluating Distributed Application Deployments in Multi-clouds," 2013 IEEE 5th International Conference on Cloud Computing Technology and Science, 2013, pp. 547-554, doi: 10.1109/CloudCom.2013.79. (Year: 2013).*
M. Fagan, M. M. H. Khan and B. Wang, "Leveraging Cloud Infrastructure for Troubleshooting Edge Computing Systems," 2012 IEEE 18th International Conference on Parallel and Distributed Systems, Singapore, 2012, pp. 440-447, doi: 10.1109/ICPADS.2012. 67. (Year: 2012).*
International Preliminary Report on Patentability from International Application No. PCT/US2018/038435, dated Nov. 19, 2020, 8 pp.
International Search Report and Written Opinion of International Application No. PCT/US2018/038435, dated Mar. 1, 2019, 14 pp.
Le Goues et al., "GenProg: Evolutionary Program Repair", 2018, accessed on GitHub on May 1, 2018, 3pp.
Wikipedia, "Automatic Bug Fixing", Last edited Feb. 6, 2018, accessed May 1, 2018, 7pp.
Response to Communication Pursuant to Rules 161(1) and 162 EPC from European Patent Application No. 18743622.5, dated Oct. 20, 2020, filed Mar. 30, 2021, 14 pp.
Response to Communication pursuant to Rule 137(4) EPC dated Aug. 12, 2022, from counterpart European Application No. 18743622.5 filed Sep. 8, 2022, 2 pp.

* cited by examiner

SYSTEM FOR ADJUSTING APPLICATION PERFORMANCE BASED ON PLATFORM LEVEL BENCHMARKING

This application is a national stage application under 35 U.S.C. § 371 of PCT Application No. PCT/US2018/038435, filed Jun. 20, 2018, which claims the benefit of U.S. Provisional application No. 62/667,974, filed May 7, 2018.

BACKGROUND

After having received explicit permission from end users to collect and make use of performance data collected during execution of an application, a software developer may analyze the performance data (e.g., data about application stability, rendering times, battery usage) to debug issues or otherwise make improvements to the application. For example, a developer may release an application update that fixes a periodic crash identified from performance data collected from a subset of devices that execute the application.

Sometimes an issue may not be apparent from performance data but may still be observable to a user or detectable in other ways. An application developer may therefore be unaware that a performance issue with their application exists. Other times an issue may be attributed to a defect in a hardware component, an operating system or computing platform, or a computing service that is maintained outside an application developer's control. As a result of these defects, different software developers may duplicate efforts to resolve similar issues that appear during execution of their respective applications. Sometimes, even if an application developer is aware of a performance issue with their application, the application developer may lack the knowledge to resolve the issue. As a result, an application may underperform, potentially causing frustration for end users.

SUMMARY

In general techniques of this disclosure are directed to enabling a computing system to identify anomalies with performance of an application, relative to performance of other applications that execute on similar or corresponding computing platforms (or operating systems). The computing system either recommends, or automatically implements, solutions that address identified anomalies and therefore improve the application's relative performance on the computing platform. As an example, a computing system may obtain application performance data (e.g., data about application stability, rendering times, battery usage, permission denials, startup times, wireless radio scans, and other information indicative of an anomaly or performance metric) associated with a plurality of different applications that execute on computing devices that operate corresponding (or at least similar) computing platforms. The computing system may normalize the performance data for each application by deriving, from the performance data, one or more performance metrics for each application. The computing system may compare a performance metric of a particular application to a corresponding performance benchmark established by the computing system. Comparing the performance metrics of a particular application to the established performance benchmarks may indicate an application's performance relative to other, different applications that execute on the same or similar computing platform. The computing system may determine one or more ways the particular application can improve the performance metric to meet or exceed the performance benchmark. The computing system may output a recommended improvement that a software developer can optionally implement (e.g., in a patch or software update) or in some cases, the computing system may automatically (i.e., without user intervention) reconfigure an application executable or other application resource, to automatically implement the improvement.

By establishing benchmarks and then evaluating performance metrics of applications executing on a computing platform against the benchmarks, an example computing system can identify performance issues with an application before a developer even thinks to look for performance improvements. The example computing system may output information about a gap in performance to educate a developer to understand how the performance of his or her application compares to other applications that are available on the platform. A developer need not know what areas can be improved, or even how to improve these areas. Instead, the example computing system may automatically identify areas for improvement and suggest or automatically implement fixes to improve performance of an application to be more in-line with performance of other applications executing on the computing platform. If an issue can be attributed to a defect in a hardware component, an operating system or computing platform, or a computing service that is maintained outside an application developer's control, the example computing system may provide information to the developer indicating how other software developers resolved a similar issue, thereby preventing a developer from performing unnecessary effort to find a solution. Accordingly, the example computing system may cause applications executing on a particular computing platform to perform better, operate more efficiently, and perhaps result in a more consistent user experience on the computing platform. The example computing system may therefore minimize frustrations users may otherwise experience from interactions with what would otherwise be slow or underperforming applications on a computing platform.

Throughout the disclosure, examples are described where a computing device and/or computing system may analyze information (e.g., application performance data and the like) only if the computing device and/or the computing system receives explicit permission from a user of the computing device and/or the computing system. For example, in situations discussed below in which the computing device and/or computing system may collect information about performance of applications executing at computing devices that execute similar or corresponding computing platforms, individual users may be provided with an opportunity to provide input to control whether programs or features of the computing device and/or computing system (e.g., a developer service module) can collect and make use of the information. The individual users may further be provided with an opportunity to control what the programs or features can or cannot do with the information. In addition, information collected may be pre-treated in one or more ways before it is transferred, stored, or otherwise used by a computing device and/or computing system, so that personally-identifiable information is removed. For example, before an example computing system stores performance data associated with an application executing at a computing device, the example computing system may pre-treat the performance data to ensure that any user identifying information or device identifying information embedded in the performance data is removed. Thus, the user may have control over whether information is collected about the user and user's device, and how such information, if collected, may be used by the computing device and/or computing system.

In one example, a method is described that includes obtaining, by a computing system, first performance data collected during execution of a first application at a first group of computing devices, determining, based on the first performance data, at least one metric for quantifying performance of the first application, and comparing, by the computing system, the at least one metric to a corresponding benchmark derived from second performance data collected during execution of one or more second applications at a second group of computing devices, each of the one or more second applications being different than the first application. The method further includes determining whether the at least one metric is within a threshold amount of the corresponding benchmark, determining, based at least in part on determining that the at least one metric is not within the threshold amount of the corresponding benchmark, a fix to the first application, and outputting, by the computing system, for presentation at a developer device, an indication of the fix to the first application.

In another example, a computer-readable storage medium is described including instructions that, when executed, cause at least one processor to obtain first performance data collected during execution of a first application at a first group of computing devices, determine, based on the first performance data, at least one metric for quantifying performance of the first application, and compare the at least one metric to a corresponding benchmark derived from second performance data collected during execution of one or more second applications at a second group of computing devices, each of the one or more second applications being different than the first application. The instructions, when executed, further cause the at least one processor to determine whether the at least one metric is within a threshold amount of the corresponding benchmark, determine, based at least in part on determining that the at least one metric is not within the threshold amount of the corresponding benchmark, a fix to the first application, and output, for presentation at a developer device, an indication of the fix to the first application.

In another example, a computing system is described that includes at least one processor configured to obtain first performance data collected during execution of a first application at a first group of computing devices, determine, based on the first performance data, at least one metric for quantifying performance of the first application, and compare the at least one metric to a corresponding benchmark derived from second performance data collected during execution of one or more second applications at a second group of computing devices, each of the one or more second applications being different than the first application. The at least one processor is further configured to determine whether the at least one metric is within a threshold amount of the corresponding benchmark, determine, based at least in part on determining that the at least one metric is not within the threshold amount of the corresponding benchmark, a fix to the first application, and output, for presentation at a developer device, an indication of the fix to the first application.

In another example, a system is described including means for obtaining first performance data collected during execution of a first application at a first group of computing devices, means for determining, based on the first performance data, at least one metric for quantifying performance of the first application, and means for comparing the at least one metric to a corresponding benchmark derived from second performance data collected during execution of one or more second applications at a second group of computing devices, each of the one or more second applications being different than the first application. The system further includes means for determining whether the at least one metric is within a threshold amount of the corresponding benchmark, means for determining, based at least in part on determining that the at least one metric is not within the threshold amount of the corresponding benchmark, a fix to the first application, and means for outputting, for presentation at a developer device, an indication of the fix to the first application.

In another example, a method is described that includes outputting, by a computing device, to a computing system, first performance data collected during execution of a first application; receiving, by the computing device, from the computing system, instructions to execute a fix of the first application that improves performance of the first application relative to performance of one or more second applications executing at a group of computing devices, each of the one or more second applications being different than the first application; and executing, by the computing device, the instruction to execute the fix of the first application.

In another example, a computer-readable storage medium is described including instructions that, when executed, cause at least one processor to output, to a computing system, first performance data collected during execution of a first application; receive, from the computing system, instructions to execute a fix of the first application that improves performance of the first application relative to performance of one or more second applications executing at a group of computing devices, each of the one or more second applications being different than the first application; and execute the instruction to execute the fix of the first application.

In another example, a computing device is described that includes at least one processor configured to output, to a computing system, first performance data collected during execution of a first application; receive, from the computing system, instructions to execute a fix of the first application that improves performance of the first application relative to performance of one or more second applications executing at a group of computing devices, each of the one or more second applications being different than the first application; and execute the instruction to execute the fix of the first application.

In another example, a system is described including means for outputting, to a computing system, first performance data collected during execution of a first application; means for receiving, from the computing system, instructions to execute a fix of the first application that improves performance of the first application relative to performance of one or more second applications executing at a group of computing devices, each of the one or more second applications being different than the first application; and means for executing the instruction to execute the fix of the first application.

In another example, a method is described that includes receiving, by a computing device, from a computing system, a recommendation for a fix of a first application executing at a first group of computing devices that improves performance of the first application relative to performance of one or more second applications executing at a second group of computing devices, each of the one or more second applications being different than the first application; receiving, by the computing device, user input authorizing the fix of the first application; responsive to sending, to the computing system, an indication of the user input authorizing the fix of the first application, receiving, by the computing device, from the computing system, instructions to execute the fix of the first application; and executing, by the computing device, based on the instructions, the fix of the first application.

In another example, a computer-readable storage medium is described including instructions that, when executed, cause at least one processor to receive, from a computing system, a recommendation for a fix of a first application executing at a first group of computing devices that improves performance of the first application relative to performance of one or more second applications executing at a second group of computing devices, each of the one or more second applications being different than the first application; receive user input authorizing the fix of the first application; responsive to sending, to the computing system, an indication of the user input authorizing the fix of the first application, receive, from the computing system, instructions to execute the fix of the first application; and execute, based on the instructions, the fix of the first application.

In another example, a computing device is described that includes at least one processor configured to receive, from a computing system, a recommendation for a fix of a first application executing at a first group of computing devices that improves performance of the first application relative to performance of one or more second applications executing at a second group of computing devices, each of the one or more second applications being different than the first application; receive user input authorizing the fix of the first application; responsive to sending, to the computing system, an indication of the user input authorizing the fix of the first application, receive, from the computing system, instructions to execute the fix of the first application; and execute, based on the instructions, the fix of the first application.

In another example, a system is described including means for receiving, from a computing system, a recommendation for a fix of a first application executing at a first group of computing devices that improves performance of the first application relative to performance of one or more second applications executing at a second group of computing devices, each of the one or more second applications being different than the first application; means for receiving user input authorizing the fix of the first application; responsive to sending, to the computing system, an indication of the user input authorizing the fix of the first application, means for receiving, from the computing system, instructions to execute the fix of the first application; and means for executing, based on the instructions, the fix of the first application.

The details of one or more examples are set forth in the accompanying drawings and the description below. Other features, objects, and advantages of the disclosure will be apparent from the description and drawings, and from the claims.

DETAILED DESCRIPTION

Figure 1:
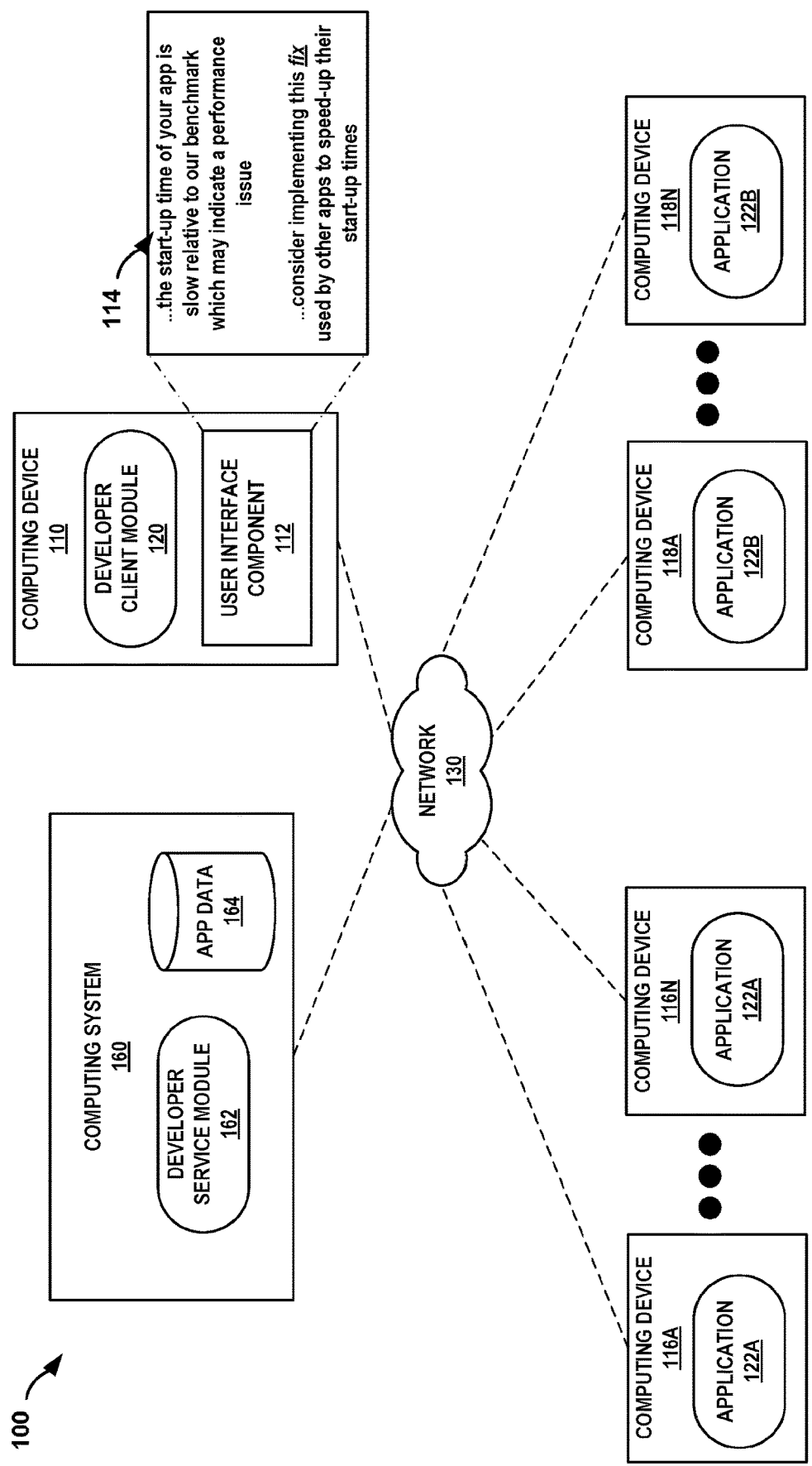
FIG. 1 is a conceptual diagram illustrating an example computing system configured to identify performance issues with an application, relative to performance of other applications that execute on similar or corresponding computing platforms, and determine ways to improve performance of the application, in accordance with one or more aspects of the present disclosure.

FIG. 1 is a conceptual diagram illustrating an example computing system configured to identify performance issues with an application, relative to performance of other applications that execute on similar or corresponding computing platforms, and determine ways to improve performance of the application, in accordance with one or more aspects of the present disclosure. System 100 includes computing system 160 in communication, via network 130, with computing device 110, computing devices 116A-116N (collectively "computing devices 116"), and computing devices 118A-118N (collectively "computing devices 118"). Although operations attributed to system 100 are described primarily as being performed by computing system 160 and computing devices 110, 116, and 118, in some examples, the operations of system 100 may be performed by additional or fewer computing devices and systems than what is shown in FIG. 1. For example, computing devices 110, 116, and 118, may be a single computing device.

Computing system 160 includes developer service module 162 and application data store 164. Computing device 110 includes developer client module 120 and further includes user interface component ("UIC") 112 which is configured to output user interface 114. Each of computing devices 116 executes a respective instance of application 122A and each of computing devices 118 executes a respective instance of application 122B.

Network 130 represents any public or private communications network, for instance, cellular, Wi-Fi, and/or other types of networks, for transmitting data between computing systems, servers, and computing devices. Network 130 may include one or more network hubs, network switches, network routers, or any other network equipment, that are operatively inter-coupled thereby providing for the exchange of information between computing system 160 and computing devices 110, 116, and 118. Computing system 160 and computing devices 110, 116, and 118 may transmit and receive data across network 130 using any suitable communication techniques.

Computing system 160 and computing devices 110, 116, and 118 may each be operatively coupled to network 130 using respective network links. The links coupling computing system 160 and computing devices 110, 116, and 118 to network 130 may be Ethernet, ATM or other types of network connections, and such connections may be wireless and/or wired connections.

Computing system 160 represents any combination of one or more computers, mainframes, servers, blades, cloud computing systems, or other types of remote computing systems capable of exchanging information via network 130 as part of an application performance evaluation service. That is, computing system 160 may receive application performance data via network 130 and analyze the performance data to determine performance issues and ways to resolve the performance issues of applications executing at computing devices 116, 118. Computing system 160 may output recommendations to fix any identified performance issues uncovered during the analysis of the performance data. In some cases, computing system 160 outputs the recommendations and other information about its analysis to computing device 110 for subsequent presentation, e.g., via user interface 114, to a developer or other user of computing device 110. In some examples, computing system 160 may interface with computing devices 116, 118 directly to implement fixes for improving performance of individual applications executing at computing devices 116, 118.

Developer service module 162 controls computing system 160 to perform specific operations for implementing the application performance evaluation service provided by computing system 160. Developer service module 162 may provide an interface between computing system 160 and client devices, such as computing device 110, that access the performance evaluation service provided by computing system 160, e.g., to obtain information about an application's performance and ways to improve the application's performance. Developer service module 162 may perform operations described herein using software, hardware, firmware, or a mixture of hardware, software, and firmware residing in and/or executing at computing system 160. Computing system 160 may execute developer service module 162 with multiple processors or multiple devices, as virtual machines executing on underlying hardware, as one or more services of an operating system or computing platform, and/or as one or more executable programs at an application layer of a computing platform of computing system 160.

Developer service module 162 is configured to collect application performance data from different applications that execute on similar or corresponding computing platforms. Developer service module 162 analyzes application performance data to determine issues in a particular application's performance, relative to other, different applications that execute in a similar or corresponding execution environment. That is, unlike other debugging or analysis tools that might analyze application performance data for a single application to determine performance issues that might arise as the application executes on different computing architectures, operating systems, or computing platforms, developer service module 162 instead identifies performance discrepancies between individual applications and other, different applications that execute in similar or corresponding computing environments.

Developer service module 162 collects and stores application performance data collected from network 130 at application data store 164. The performance data (e.g., data about application stability, rendering times, battery usage, permission denials, startup times, wireless radio scans, and other information indicative of an anomaly or performance metric) contained in application data store 164 may be organized and searchable according to an application identifier (e.g., name, publisher, etc.), application category (e.g., travel, leisure, entertainment, etc.), application genre (e.g., navigation, transportation, game, etc.), or other searchable criteria. For example, application data store 164 may store first performance data collected from computing devices 116 during their respective executions of application 122A separately from second performance data collected from computing devices 118 during their respective executions of application 122B.

In some examples, performance data stored in application data store 164 may be a used as a proxy indicator or indirect indicator for performance. In other words, the data collected and maintained at data store 164 may be low-level performance details that by themselves do not provide insight into a particular issue but when aggregated together, are a sign of performance. For example, radio scans and location querying tend to consume a lot of battery power and therefore, a computing platform may request that applications minimize performing such functions unless necessary or only if done with a limited frequency. An application therefore that performs more radio scans or locations queries than other applications may indicate that the application is a poor performer, relative to the other applications, for battery consumption. Developer service module 162 may make further determinations about things like "rendering performance" or other categories of performance by looking at multiple types of performance data concurrently.

When collecting and storing performance data, developer service module 162 may take precautions to ensure that user privacy is preserved. That is, developer service module 162 may only collect, store, and analyze performance data if developer service module 162 receives explicit permission from a user of the computing device from which the performance data originated. For example, in situations discussed below in which developer service module 162 may collect information about performance of applications executing at computing devices 116, 118, individual users of computing devices 116, 118 may be provided with an opportunity to provide input to computing devices 116, 118 and/or computing system 160 to control whether developer service module 162 can collect and make use of their information. The individual users may further be provided with an opportunity to control what developer service module 162 can or cannot do with the information. Application performance data may be pre-treated in one or more ways before it is transferred to, stored by, or otherwise used by developer service module 162, so that personally-identifiable information is removed. For example, before developer service module 162 collects performance data associated with application 122A while executing at computing device 116A, computing device 116A may pre-treat the performance data to ensure that any user identifying information or device identifying information embedded in the performance data is removed before being transferred to computing system 160. In other examples, developer service module 162 may pre-treat the performance data upon receipt and before storing the performance data at data store 164. In either case, the user may have control over whether the performance data is collected, and how such information, if collected, may be used by computing device 116A and computing system 160.

Computing device 110 represents any suitable computing device or computing system capable of exchanging information via network 130 to access the performance evaluation service provided by computing system 160 for obtaining information about application performance and ways to improve application performance. That is, computing device 110 may be a software developer or designer workstation configured to access performance data stored at data store 164, obtain analysis performed by developer service module 162, and obtain performance-improvement recommendations generated by developer service module 162.

Developer client module 120 may provide the interface between computing device 110 and the service provided by computing system 160. For example, developer client module 120 may be a stand-alone application executing at computing device 110, or in some examples, developer client module 120 may be a subroutine or internet application accessed from an internet browser executing at computing device 110. In either case, developer client module 120 is configured to exchange information with computing system 160 to implement the performance evaluation service.

Developer client module 120 is configured to receive, from computing system 160 and via network 130, results of an analysis of application performance data and recommendations determined by computing system 160 to improve the results. Module 120 may perform operations described herein using software, hardware, firmware, or a mixture of hardware, software, and firmware residing in and/or executing at computing device 110. Computing device 110 may execute module 120 with multiple processors or multiple devices, as virtual machines executing on underlying hardware, as one or more services of an operating system or computing platform, and/or as one or more executable programs at an application layer of a computing platform of computing device 110.

UIC 112 of computing device 110 may function as an input and/or output device for computing device 110. UIC 112 may be implemented using various technologies. For instance, UIC 112 may function as an input device using presence-sensitive input screens, microphone technologies, infrared sensor technologies, or other input device technology for use in receiving user input. UIC 112 may function as output device configured to present output to a user using any one or more display devices, speaker technologies, haptic feedback technologies, or other output device technology for use in outputting information to a user.

Developer client module 120 may cause UIC 112 to output a user interface associated with the service provided by computing system 160. For example, as shown in FIG. 1, developer client module 120 may send instructions to UIC 112 that cause UIC 112 to display user interface 114 at a display screen of UIC 112. User interface 114 may present information obtained from developer service module 162 in visual, audible, or haptic formats so that a developer can better understand how performance of a particular application compares to performance of other applications, executing on similar or corresponding computing platforms.

Computing devices 116, 118 each represent any suitable computing device or computing system capable of locally executing applications, such as applications 122A and 122B, and further capable of exchanging information via network 130 with computing system 160 about performance of the locally executing applications. Examples of computing devices 116, 118 include mobile phones, tablet computers, laptop computers, desktop computers, servers, mainframes, blades, wearable devices (e.g., computerized watches etc.), home automation devices, assistant devices, gaming consoles and systems, media players, e-book readers, television platforms, automobile navigation or infotainment systems, or any other type of mobile, non-mobile, wearable, and non-wearable computing device configured to execute applications on a computing platform being analyzed by developer service module 162. Each of computing devices 116, 118 executes applications on similar or corresponding computing platforms, such as a common operating system.

Applications 122A and 122B represent two different machine-readable, executables configured to operate at an application layer of similar or identical computing platforms that operate on each of computing devices 116 and 118. Computing devices 116 may execute instructions associated with a particular computing platform in which application 122A executes and computing devices 118 may execute similar instructions associated with the same computing platform as computing devices 116, however, for executing application 122B instead of application 122A.

Examples of applications 122A and 122B are too numerous to list. As some examples, applications 122A and 122B may include business applications, developer tools, educational applications, entertainment applications, financial applications, game applications, graphic or design applications, health and fitness applications, lifestyle or assistant applications, medical applications, music applications, news applications, photography, video, and other multimedia applications, productivity applications, reference applications, social networking applications, sports applications, travel applications, utility applications, weather applications, communication applications, calendar applications, or any other category or type of application.

Applications 122A and 122B are completely different applications and may be associated with different application developers, producers, versions, and the like. In some examples, applications 122A and 122B are "peers" being that they are from a same category or genre of application (e.g., travel) and perform similar functions or provide similar features (e.g., both may enable transportation booking). In other examples, applications 122A and 122B are from a same category or genre of application (e.g., travel) but are not "peers" as the two applications may perform different functions or provide different features (e.g., one may enable transportation booking and another may aid in navigation). In any event, whether applications 122A and 122B are merely from similar categories or genres, or whether applications 122A and 122B are peers, applications 122A and 122B are completely different applications from different application developers, producers, or the like.

In operation, a user of computing device 110, who in the example of FIG. 1 is a software developer or designer of application 122A, may wish to understand how performance of application 122A compares to performance of other applications, such as application 122B, executing on the same or similar computing platforms. The user may provide input at a presence-sensitive screen of UIC 112 at or near a location of UIC at which user interface 114 is displayed. UIC 112 may provide information about the input to developer client module 120 and in response to the information about the input, developer client module 120 may access the service provided by developer service module 162 for obtaining an analysis of the performance of application 122A relative to performance of other applications executing on similar or corresponding computing platforms.

After having received explicit permission from each of the end users of computing devices 116, 118 to collect and make use of performance data collected during execution of applications 122A, 122B, developer service module 162 of computing system 160 may obtain performance data collected by computing devices 116, 118 while computing devices 116, 118 were executing respective instances of applications 122A, 122B. For example, when application 122A executes at computing device 116A, application 122A may output performance data indicative of how application 122A performs in an execution environment of computing device 116A. Computing device 116A may send, via network 130, the performance data to computing system 160 where developer service module 162 may store the performance data at application performance data store 164. Each of computing devices 116, 118 may perform similar operations as computing device 116A to collect and send performance data to computing system 160 that is indicative of how applications 122A, 122B perform in respective execution environments of computing devices 116, 118.

Developer service module 162 may analyze the performance data of each of applications 122A and 122B to determine one or more performance metrics for each of applications 122A and 122B. The basis behind the performance metrics is described in greater detail with respect to the additional FIGS. However, in general, a performance metric may be any quantitative and measurable value that can be derived from application performance data to indicate a level of performance associated with some aspect of an application. Some examples of performance metrics include: battery statistics (e.g., consumption rates, etc.), stability measurements (e.g., a crash rate, etc.), rendering metrics (e.g., latency between frame renderings, etc.), timing metrics (e.g., start-up time, transition delay from one mode to another, delay in implementing an intent, delays for retrieving or uploading information, etc.), permission metrics (e.g., frequency of unsuccessful or user denied requests to make use of device component or user information, etc.).

With a set of defined performance metrics, developer service module 162 may establish one or more benchmarks to use in evaluating the performance metrics of individual applications; specifically, to determine an application's performance on a computing platform, relative to performance of other applications that run on the computing platform. Said differently, developer service module 162 may determine, based on a performance metric of one or more applications, a performance goal that other applications should operate towards so that a user interacting with applications on the computing platform has an enjoyable, consistent, and frustration free user experience no matter which application he or she is interacting with.

To establish a benchmark, developer service module 162 may rank the performance metrics of multiple applications to determine a highest performing application, for each particular metric. In some examples, developer service module 162 may determine a composite metric (e.g., an average value, median value, etc.) based on two or more applications' metrics to use as a benchmark in evaluating performance of other applications. In some examples, developer service module 162 may determine a composite metric based two or more highest ranking, two or more lowest ranking, or some other combination of applications' metrics to use as a benchmark in evaluating performance of other applications.

Developer service module may evaluate an application by comparing a performance metric of the application to a corresponding benchmark. For instance, if performance data stored at data store 164 indicates that application 122A has a performance metric that is within a threshold of a benchmark value, developer service module 162 may determine that application 122A does not have a performance issue, as the performance of the application relates to that particular metric. Otherwise, developer service module 162 may determine that if application 122A has a performance metric that is outside the threshold of the benchmark value, that application 122A does have a performance issue, as the performance of application 122A relates to that particular metric.

In the example of FIG. 1, assume developer service module 162 establishes a benchmark for a particular metric (e.g., start-up time) to be based on a corresponding metric associated with application 122B. Developer service module 162 may subsequently evaluate start-up time of application 122A by comparing the start-up time of application 122A to the benchmark.

Developer service module 162 may determine whether the start-up time metric is within a threshold amount of the benchmark. In some examples, the threshold amount may be a percentage (e.g., ten percent) or a value (e.g., two milliseconds). In some examples, the threshold amount may be zero and satisfying the benchmark may require meeting or exceeding the benchmark performance. In some examples, the threshold amount may be a percentile ranking of an application relative to other applications executing on the computing platform. That is, to satisfy a benchmark, developer service module may require an application's performance to be better than the bottom 'x' percentile (e.g., where 'x' is any percentile value) of other applications that have been rated against the benchmark.

In the example of FIG. 1, developer service module 162 may determine that the start-up time of application 122A does not satisfy the start-up time benchmark as the start-up time of application 122A (e.g., on average) exceeds the benchmark by more than a threshold amount of time (e.g., five milliseconds). Responsive to determining that a performance metric is not within a threshold amount of a corresponding benchmark, developer service module may determine a fix to the application to improve its performance.

The fix to the application may include one or more modifications to source code or a configuration file associated with the application. In some examples, the fix to the application may include disabling a library, function call, software development kit, application programming interface, or service utilized by the application. In some examples, the fix to the application may include replacing a first library, function call, or service utilized by the application with an alternative library, function call, or service.

For example, in addition to tracking performance data associated with applications executing at computing devices 116, 118, developer service module 162 may maintain information about ways to improve application performance, relative to each specific metric. In some examples, the information may be based on feedback obtained from other developers of applications that have metrics which form the basis for benchmarks. In some examples, the information may be based on feedback obtained from other developers of applications that have found ways to improve their metrics relative to the benchmarks. In some examples, the information may be based on work-arounds obtained from a developer of the computing platform who may have uncovered the fix after identifying ways that other similarly situated applications executing on the computing platform have improved their metrics relative to the benchmarks.

In some examples, the information about ways to improve application performance may be derived automatically by developer service module 162 (e.g., using a machine learning model, trial and error experimentation, or other ways which are described in more detail with respect to the additional FIGS.). For example, developer service module 162 may determine which application programming interfaces (APIs) or libraries an underperforming application uses, determine that other better performing applications on the computing platform use different APIs or libraries for the same functionality (e.g., a different third-party library for user authentication), and conclude that the underperforming application may improve its performance by replacing existing APIs or library calls with those used by the better performing applications.

In the example of FIG. 1, developer service module 162 may determine that the start-up time issue identified with application 122A could be attributed to a slow-performing application programming interface (API) relied on by application 122A during start-up which has been observed by developer service module 162 to cause slow start-up times in other applications. As some examples, developer service module 162 may determine a fix to the start-up time issue with application 122A is to: use a more responsive API, relocate the API call outside the start-up thread, or adjust a start-up sequence so that the slow API does not get used until other resources of application 122A are otherwise up and running.

In any case, once developer service module 162 determines a fix, developer service module 162 may share information about the fix with developer client module 120, for subsequent presentation to the user developer. Developer service module 162 may output, for presentation at computing device 110, an indication of the fix to application 122A. For example, developer service module 162 may send data via network 130 that is interpreted by developer client module 120 as an instruction to update user interface 114 with information about the fix.

Developer client module 120, in response to receiving instruction to update user interface 114 with information about the fix, may cause UIC 112 to output user interface 114. That is, developer client module 120 may cause UIC 112 to output, for display a graphical indication of any determined performance anomalies or issues and/or any fix identified to resolve the determined performance anomalies or issues. In this way, a computing system that operates in accordance to the described techniques may output an indication of a performance issue and a potential fix which a software developer, designer, or other user of the computing system, can elect to implement or not implement, so as to improve performance of an application, relative to performance of other applications executing in a similar or corresponding computing platform.

By establishing benchmarks and then evaluating performance metrics of applications executing on a computing platform against the benchmarks, an example computing system can identify performance issues with an application before a developer even thinks to look for performance improvements. The example computing system may output information about a gap in performance to educate a developer to understand how the performance of his or her application compares to other applications that are available on the platform. A developer need not know what areas need improving, what areas can be improved, or even how to improve these areas. Instead, the example computing system may automatically identify areas for improvement and suggest or automatically implement fixes to improve performance of an application to be more in-line with performance of other applications executing on the computing platform. Accordingly, the example computing system may cause applications executing on a particular computing platform to operate more efficiently and perhaps, provide a more consistent user experience as a user interacts with different applications on the computing platform.

Figure 2:
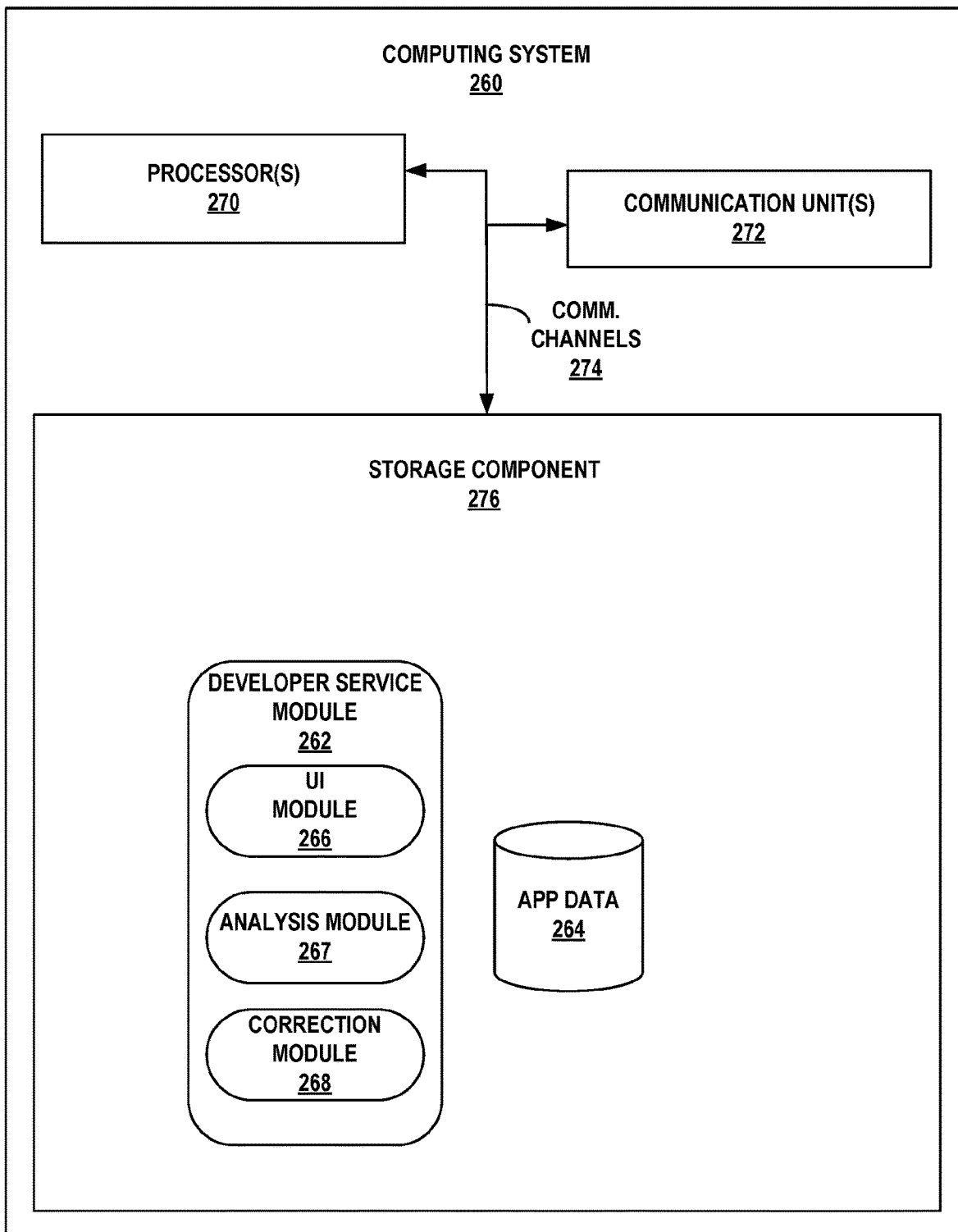
FIG. 2 is a block diagram illustrating an example computing system configured to identify performance issues with an application, relative to performance of other applications that execute on similar or corresponding computing platforms, and determine ways to improve performance of the application, in accordance with one or more aspects of the present disclosure.

FIG. 2 is a block diagram illustrating an example computing system configured to identify performance issues with an application and determine ways to improve performance of the application, relative to performance of other applications that execute on similar or corresponding computing platforms, in accordance with one or more aspects of the present disclosure. Computing system 260 of FIG. 2 is described below as an example of computing system 160 of FIG. 1. FIG. 2 illustrates only one particular example of computing system 260, and many other examples of computing system 260 may be used in other instances and may include a subset of the components included in computing system 260 or may include additional components not shown in FIG. 2.

As shown in the example of FIG. 2, computing system 260 includes one or more processors 270, one or more communication units 272, and one or more storage components 276 communicatively coupled via communication channel 274. Storage components 276 includes developer service module 262 and application performance data store 264. Developer service module 262 includes UI module 266, analysis module 267, and correction module 268.

Communication channels 274 may interconnect each of the components 266, 270, 272, and 276 for inter-component communications (physically, communicatively, and/or operatively). In some examples, communication channels 274 may include a system bus, a network connection, an inter-process communication data structure, or any other method for communicating data.

One or more communication units 272 of computing system 260 may communicate with external devices (e.g., computing devices 110, 116, 118 of FIG. 1) via one or more wired and/or wireless networks by transmitting and/or receiving network signals on the one or more networks. Examples of communication units 272 include a network interface card (e.g. such as an Ethernet card), an optical transceiver, a radio frequency transceiver, a GPS receiver, or any other type of device that can send and/or receive information. Other examples of communication units 272 may include short wave radios, cellular data radios, wireless network radios, as well as universal serial bus (USB) controllers.

One or more storage components 276 within computing system 260 may store information for processing during operation of computing system 260 (e.g., computing system 260 may store application performance data collected and accessed by modules 262, 266, 267, and 268, and data store 264 during execution at computing system 260). In some examples, storage component 276 is a temporary memory, meaning that a primary purpose of storage component 276 is not long-term storage. Storage components 276 on computing system 260 may be configured for short-term storage of information as volatile memory and therefore not retain stored contents if powered off. Examples of volatile memories include random access memories (RAM), dynamic random-access memories (DRAM), static random access memories (SRAM), and other forms of volatile memories known in the art.

Storage components 276, in some examples, also include one or more computer-readable storage media. Storage components 276 in some examples include one or more non-transitory computer-readable storage mediums. Storage components 276 may be configured to store larger amounts of information than typically stored by volatile memory. Storage components 276 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 276 may store program instructions and/or information (e.g., data) associated with modules 262, 266, 267, and 268, and data store 264. Storage components 276 may include a memory configured to store data or other information associated with modules 262, 266, 267, and 268, and data store 264.

One or more processors 270 may implement functionality and/or execute instructions associated with computing system 260. Examples of processors 270 include application processors, display controllers, graphics processors, auxiliary processors, one or more sensor hubs, and any other hardware configure to function as a processor, a processing unit, or a processing device. Modules 262, 266, 267, and 268 may be operable by processors 270 to perform various actions, operations, or functions of computing system 260. For example, processors 270 of computing system 260 may retrieve and execute instructions stored by storage components 276 that cause processors 270 to perform operations attributed to modules 262, 266, 267, and 268. The instructions, when executed by processors 270, may cause computing system 260 to store information within storage components 276.

Developer service module 262 may include some or all of the functionality of developer service module 162 of computing system 160 of FIG. 1. Developer service module 262 may additionally include some or all of the functionality of client service module 120 of computing device 110 of FIG. 1. Developer service module 262 may perform similar operations as modules 162 and 120 for providing an application performance evaluation service that identifies performance anomalies in applications, relative to other application executing on a computing platform, and recommends or implements fixes to improve the applications' performance on the computing platform.

UI module 280 may provide a user interface associated with the service provided by developer service module 262. For example, UI module 280 may host a web interface from which a client, such as computing device 110, can access the service provided by developer service module 262. For example, a user of computing device 110 may interact with a web browser or other application (e.g., developer client module 120) executing at or accessible from computing device 110. UI module 280 may send information to the web browser or other application that causes the client to display a user interface, such as user interface 114 of FIG. 1.

Analysis module 267 may analyze application performance data stored at data store 264. Analysis module 267 may determine performance metrics associated with individual applications executing at a computing platform, determine benchmarks for evaluating the performance metrics, and compare the performance metrics to the benchmarks to determine whether an individual application has a potential performance anomaly or issue, relative to other applications executing on the computing platform.

As one example of a performance metric, analysis module 267 may determine a permissions denial rate associated with an application. For example, a permission may grant an application access to a user's calendar, a camera, a user's contact list, a user's or devices location, a microphone, a telephone, other sensors, messaging services, and storage. Applications often depend specific permissions to function properly, yet a developer may be unaware of what percentage of users have actually agreed to grant the application each permission and how the user behavior towards granting or not granting the application each permission compares with other applications executing on a computing platform. A computing platform may want to minimize a frequency of permission denials to improve user satisfaction with the computing platform. Analysis module 267 may define a permissions denial rate as an amount (e.g., a percentage) of daily permission sessions during which users did not grant or otherwise denied an application a permission.

As another example of a performance metric, analysis module 267 may determine a start-up time for an application. The start-up time may indicate an amount of time for an application to launch. If a user has a choice between two peer applications, he or she may more often choose to launch the peer with the shortest start-time. A computing platform may want all applications to launch as quickly as possible so as to provide the best user experience with the computing platform.

Analysis module 267 may quantify a start-time based on a measurement of time (e.g., seconds, milliseconds, etc.). Analysis module 267 may quantify a start-time as being one of multiple different levels, e.g., slow, moderate, fast.

Analysis module 267 may further quantify a start-time metric in one or more other ways. For example, analysis module 267 may assign an application a "slow cold start" label when a percentage of daily sessions during which users of an application experienced at least one cold startup time of more than five seconds. A cold start of an application is when an application launches from scratch (e.g., often displaying a splash screen, etc.). Whereas, analysis module 267 may assign an application a "slow warm start" label when a percentage of daily sessions during which users of an application experienced at least one hot startup time of more than one and a half seconds. A warm start of an application occurs when an application is brought into the foreground of a user interface, after previously executing in the background (e.g., often displaying a previously viewed screen that was last in view when the application was last viewed, etc.). Analysis module 267 may assign other types of labels to a start-up time metric that are specific to a particular computing platform.

As another example of a performance metric, analysis module 267 may determine a failed wireless signal scan metric. For example, some applications may cause a computing device to scan for available Bluetooth®, Wi-Fi®, near-field-communication (NFC), or other wireless signals. Such scanning is power intensive and often results in increased battery drain. Therefore, a computing platform may wish to encourage the prevention of failed wireless signal scans that result in wasted battery consumption. A failed wireless signal scan may indicate a percentage of battery sessions (i.e., periods between two full charges of a device) during which users of an application experienced at least one failed wireless signal scan that lasted more than thirty minutes or some other time duration.

Other examples of performance metrics generated by analysis module 267 may include an application non-responsive (ANR) rate that is defined as a percentage of daily sessions during which application users experienced at least one occurrence where an application was non-responsive and required restart or a crash rate that indicates a percentage of daily sessions during which users experienced at least one crash of an application. Still other performance metric examples include a stuck wake lock rate that indicates a percentage of battery sessions during which users experienced at least one partial wake lock of more than one hour while the app was in the background.

Correction module 268 may obtain information from analysis module 267 about a potential issue with an application executing on a computing platform and determine a fix or other action for computing system 260 to take for addressing the issue and improve the application's performance, relative to other applications executing on the same or similar computing platform. For example, correction module 268 may cause UI module 266 to output a recommendation for fixing an application so that it provides a detailed explanation for a permission request when the permission denial rate outside a suitable range for the computing platform.

In some cases, correction module 268 may alert computing system 160 to cause an underperforming application to be demoted in ratings in an application store. If an application has performance metrics that are far outside a threshold amount of a benchmark, correction module 268 may alert computing system 160 to cause the underperforming application to be undiscoverable or unavailable from the application store.

Correction module 268 may maintain information about ways to improve application performance, relative to each specific issue identified by analysis module 267, for each performance metric. For example, correction module 268 may obtain feedback from application developers that have metrics which form the basis for benchmarks or have otherwise found ways to improve their application's performance and use the feedback to provide a solution or a fix for a specific issue. Correction module 268 may obtain information from a computing platform developer of workarounds that he or she may have uncovered after identifying ways that other similarly situated applications executing on the computing platform have improved their metrics relative to the benchmarks.

In some examples, correction module 268 may determine a fix for an issue automatically and without any assistance from a user, by performing automatic bug fixing techniques. For example, correction module 268 may generate one or more potential software patches that might improve performance of an application and through trial-and-error, try the different patches to see which if any result in a fix. Correction module 268 may perform search-based program mutation, machine learning, and/or genetic programming techniques to identify one or more suitable fixes. After determining a potential fix, correction module 268 may validate the fix by testing the fix or delivering the fix to an application developer so that he or she may validate the fix.

Figure 3:
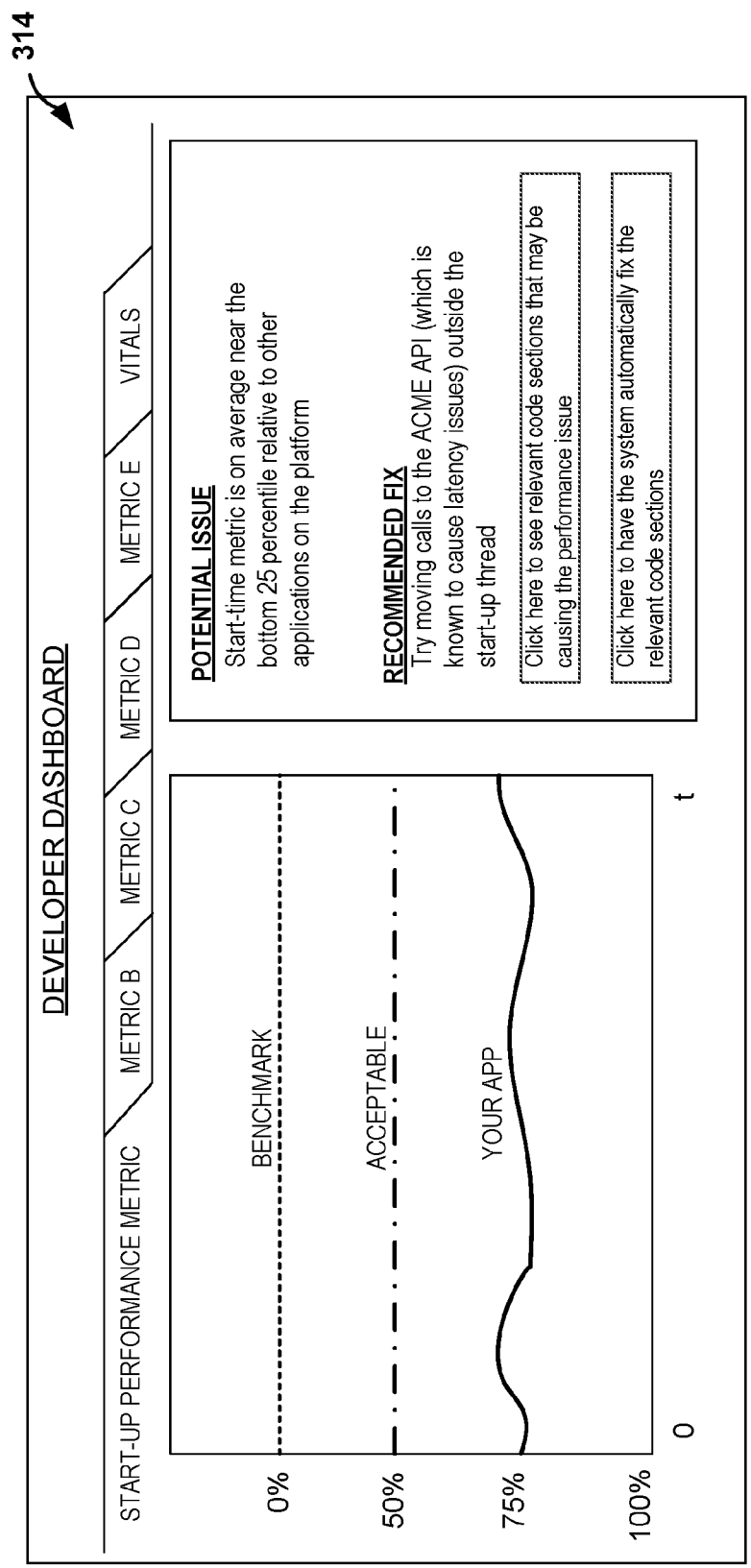
FIG. 3 is an example screen shot of a display screen of a computing device that is accessing an application performance evaluation service provided by an example computing system, in accordance with one or more aspects of the present disclosure.

FIG. 3 is an example screen shot of a display screen of a computing device accessing an application performance evaluation service provided by an example computing system, in accordance with one or more aspects of the present disclosure. FIG. 3 shows user interface 314. FIG. 3 is described in the context of system 100 of FIG. 1.

Computing system 160 may cause computing device 110 to present user interface 314 at UIC 112 when developer client module 120 requests access to the application performance evaluation service provided by developer service module 162. User interface 314 is just one example of such a user interface, many other examples may exist.

The purpose of user interface 314 is to provide an application developer with insights into specific performance metrics obtained about a target application in order to understand how the target application is performing relative to the top performing applications executing on a computing platform. In some examples, the relative performance of an application may be based on top performing applications in a similar category or genre as the target application. In other examples, the relative performance of an application may be based on top performing applications that are considered peers. In any event, a benefits of user interface 314 includes causing observable or measurable improvements to an overall computing platform or application ecosystem, not just improvements to an individual application executing in that ecosystem. For example, developers can view user interface 314 to understand where an application's performance may be lagging relative to peers or other applications and therefore be motivated to improve the application's performance, which results in an overall performance improvement of the computing platform.

User interface 314 is divided into several tabs or sections, with each tab being associated with a different performance metric or group of performance metrics. For example, as shown in FIG. 3, the start-up metric tab is in the foreground of user interface 314 with metrics B-E and a group of vital metrics appearing on tabs that re hidden from view in the background of user interface 314.

Each tab may include a results section (e.g., shown as a graph, table, chart, or other data format) for providing information about an application's relative performance as compared to the benchmark and an acceptable threshold level within the benchmark. The start-up performance metric of the application in the example of FIG. 3 is outside an acceptable threshold amount of the benchmark.

In some examples, the results section includes information about where an application's performance is compared to other applications executing on the computing platform. For example, in the example of FIG. 3, the application's start-up metric is in line with the bottom twenty-five percent of applications executing on the computing platform.

User interface 314 may designate an application's performance using color or other formatting. For example, in cases where a performance metric is outside an acceptable threshold level of a benchmark, user interface 314 may use a red color font or line color to emphasize that the application may have a potential performance issue. In cases where the performance metric is inside the acceptable threshold level of the benchmark, user interface 314 may use a green color font or line color to emphasize that the application is performing similarly to other top performing applications on the computing platform.

Each tab of user interface 314 may include a summary and resolution section where potential issues are clearly identified and recommended fixes for the potential issues are displayed. For example, user interface 314 includes a detailed summary of the start-time issue along with potential fixes that a developer may implement to improve the start-time metric of the application.

Also included in user interface 314 may be selectable elements that cause computing system 160 to perform various actions to further aid a developer in improving the performance of an application, relative to performance of other applications executing on the computing platform. As one example, a user may select a graphical element that causes computing system 160 to link to a source file editor for viewing highlighted sections of source code that computing system 160 suspects may be a cause of the slow start time. As another example, a user may select a graphical element that causes computing system 160 to automatically modify the suspect sections of source code automatically, without further user input.

Figure 4:
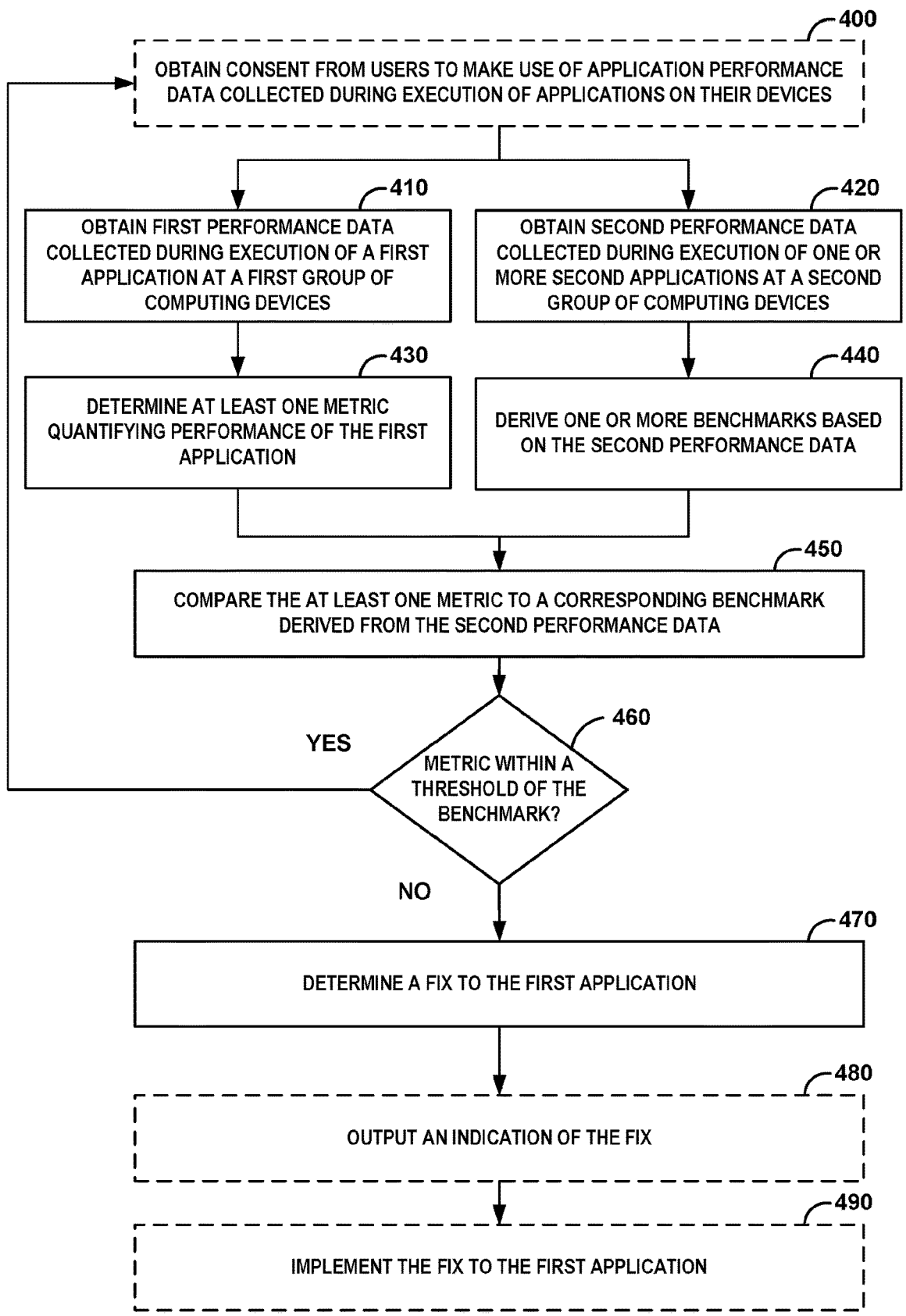
FIG. 4 is a flowchart illustrating example operations performed by an example computing system configured to identify performance issues with an application, relative to performance of other applications that execute on similar or corresponding computing platforms, and determine ways to improve performance of the application, in accordance with one or more aspects of the present disclosure.

FIG. 4 is a flowchart illustrating example operations performed by an example computing system configured to identify performance issues with an application and determine ways to improve performance of the application, relative to performance of other applications that execute on similar or corresponding computing platforms, in accordance with one or more aspects of the present disclosure. Operations 400-490 may be performed by a computing system, such as computing systems 160, 260. In some examples, a computing system may perform operations 400-490 in a different order than that shown in FIG. 4. In some examples, a computing system may perform additional or fewer operations than operations 400-490. For ease of description, FIG. 4 is described in the context of computing system 260 of FIG. 2.

As shown in FIG. 4, in operation, computing system 260 may obtain consent from user to make use of application performance data collected during execution of applications on their respective devices (400). For example, before computing system 260 or any of computing devices 116, 118 stores or transmits application performance data, a user of computing devices 116, 118 will be offered an opportunity to give or not give computing system 260 permission to collect and make use of such data. Only if a user clearly and unambiguously consents to such data collection will computing system 260 make use of application performance data from the user's device.

Computing system 260 may obtain first performance data collected during execution of a first application at a first group of computing devices (410) and computing system 260 may obtain second performance data collected during execution of one or more second applications at a second group of computing devices (420). For example, analysis module 267 may receive performance data being transmitted via network 130 from computing devices 116, 118. Analysis module 267 may store the performance data at data store 264.

In some examples, each computing device from the first group of computing devices and the second group of computing devices executes a respective instance of a common computing platform. In other words, each of the first and second groups of computing devices may operate a common operating system or computing platform so that analysis module, when determining performance of a particular application, determines the application performance relative to other applications executing on the same or similar computing platform as the particular application.

The first application and each of the one or more second applications may in some examples be associated with a common category or genre of application. For example, the first and second applications may be travel category applications or navigation genre applications within the same travel category.

In some examples, the first application and each of the one or more second applications are peer applications, and the first application differs from each of the one or more second applications by at least one of: functionality, title, or developer. For example, the first and second applications may be a specific type of game (e.g., first-person shooter, crossword puzzle, etc.) and while the applications may share some overlap in functionality, the applications are not the same and differ in functionality, title, game play, developer, appearance, or other feature.

Computing system 260 may determine, based on the first performance data, at least one metric quantifying performance of the first application (430). For example, analysis module 267 may compute a permissions denial rate metric based on the performance data for application 122A that indicates how often users prevent application 122A from accessing a particular permission of computing devices 116 (e.g., camera, microphone, etc.).

Computing system 260 may determine one or more benchmarks based on the second performance data (440). For example, analysis module 267 may determine an average permissions denial rate for one or more other applications executing on computing devices 116, 118 (e.g., application 122B). Analysis module 267 may use the average permissions denial rate as a benchmark for determining whether an application has too high of a permissions denial rate relative to other applications executing on the computing platform.

Computing system 260 may compare the at least one metric to a corresponding benchmark derived from the second performance data (450). For example, analysis module 267 may compare the permissions denial rate for application 122A to the benchmark established during operation 440.

If the metric is within a threshold amount of the benchmark, computing system 260 may determine that the first application does not have a performance issue with that particular metric (460, YES branch). Conversely, if the metric is not within the threshold amount of the benchmark, computing system 260 may determine that the first application has a performance issue with that particular metric (460, NO branch). Analysis module 267 may determine that the permissions denial rate for application 122A exceeds the benchmark established during operation 440 by ten percent or some other amount that exceeds a tolerable threshold.

Computing system 260 may determine a fix to the first application (470). For example, analysis module 267 may trigger correction module 268 to determine a way for application 122A to improve the permission denial rate metric such that overall performance of application 122A on the computing platform is closer to the performance of other top performing applications on the computing platform. Correction module 268 may inspect source files or other attributes of application 122A and determine that when application 122A requests permission to use a device location or camera, no explanation or reason is provided to the user for the requests. Correction module 268 may determine that the permission denial rate may be improved if application 122A included such information when making future requests.

Computing system 260 may output an indication of the fix (480). For example, correction module 268 may send a command to UI module 266 that causes a user interface, such as user interface 114 or 314, to provide information to a developer user of computing system 260 that he or she may wish to modify application 122A to provide more information when making a permission request.

Computing system 260 may implement the fix (490). For example, after outputting an indication of the recommended fix, UI module 266 may receive, from computing device 110 or other developer device, an indication of user input that authorizes the fix to be automatically implemented by computing system 260. In response to receiving the indication of user input, correction module 268 may output to computing devices 116 instructions for automatically implementing the fix to application 122A. The instructions may include updated source files, an updated executable, or an updated configuration file generated by correction module 268 and that are used during execution of application 122A to cause the fix.

In addition to implementing a fix, or instead of implementing a fix, computing system 260 may take other actions in response to determining a performance deficiency in an application relative to performance of other application on a computing platform. For example, a cause of a performance issue may not be readily apparent from existing application performance data. Computing system 260 may send instructions via network 130 that cause computing devices 116 to start collecting more detailed performance data when applications 122A executes at computing devices 116 than what is normally collected. For instance, computing system 260 may cause computing devices' 116 performance data collection rate to increase or may cause computing devices 116 to collect additional data beyond the normal data collected.

Clause 1. A method comprising: obtaining, by a computing system, first performance data collected during execution of a first application at a first group of computing devices; determining, based on the first performance data, at least one metric for quantifying performance of the first application; comparing, by the computing system, the at least one metric to a corresponding benchmark derived from second performance data collected during execution of one or more second applications at a second group of computing devices, each of the one or more second applications being different than the first application; determining whether the at least one metric is within a threshold amount of the corresponding benchmark; responsive to determining that the at least one metric is not within the threshold amount of the corresponding benchmark, determining, a fix to the first application; and outputting, by the computing system, for presentation at a developer device, an indication of the fix to the first application.

Clause 2. The method of clause 1, wherein each computing device from the first group of computing devices and the second group of computing devices executes a respective instance of a common computing platform.

Clause 3. The method of any of clauses 1 or 2, wherein the first application and each of the one or more second applications are associated with a common category or genre of application.

Clause 4. The method of clause 3, wherein the first application and each of the one or more second applications are peer applications, and the first application differs from each of the one or more second applications by at least one of: functionality, title, or developer.

Clause 5. The method of any of clauses 1-4, further comprising: receiving, from the developer device, an indication of user input that authorizes the fix to be automatically implemented by the computing system; and in response to receiving the indication of user input, outputting, by the computing system, to one or more computing devices from the first group of computing device, instructions for automatically implementing the fix to the first application.

Clause 6. The method of any of clauses 1-5, wherein the fix to the first application comprises one or more modifications to source code or a configuration file associated with the first application.

Clause 7. The method of any of clauses 1-6, wherein the fix to the first application comprises disabling a library, function call, or service utilized by the first application.

Clause 8. The method of any of clauses 1-7, wherein the fix to the first application comprises replacing a first library, function call, or service utilized by the first application with an alternative library, function call, or service.

Clause 9. The method of any of clauses 1-8, wherein the first group of computing devices and the second group of computing devices comprise a single computing device.

Clause 10. A computing system comprising at least one processor configured to perform any one of the methods of clauses 1-9.

Clause 11. A computing system comprising means for performing any one of the methods of clauses 1-9.

Clause 12. A computer-readable storage medium comprising instructions that, when executed, cause at least one processor to perform any one of the methods of clauses 1-9.

Clause 13. A method comprising: outputting, by a computing device, to a computing system, first performance data collected during execution of a first application; receiving, by the computing device, from the computing system, instructions to execute a fix of the first application that improves performance of the first application relative to performance of one or more second applications executing at a group of computing devices, each of the one or more second applications being different than the first application; and executing, by the computing device, the instruction to execute the fix of the first application.

Clause 14. A method comprising: receiving, by a computing device, from a computing system, a recommendation for a fix of a first application executing at a first group of computing devices that improves performance of the first application relative to performance of one or more second applications executing at a second group of computing devices, each of the one or more second applications being different than the first application; receiving, by the computing device, user input authorizing the fix of the first application; responsive to sending, to the computing system, an indication of the user input authorizing the fix of the first application, receiving, by the computing device, from the computing system, instructions to execute the fix of the first application; and executing, by the computing device, based on the instructions, the fix of the first application.

Clause 15. A computing device comprising at least one processor configured to perform any of the methods of clauses 13 or 14.

Clause 16. A computing system comprising means for performing any of the methods of clauses 13 or 14.

Clause 17. A computer-readable storage medium comprising instructions that, when executed, cause at least one processor to perform any of the methods of clauses 13 or 14.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
  obtaining, by a computing system, first application performance data collected during execution of a first application at a first group of end user computing devices;
  determining, based on the first application performance data, at least one metric for quantifying performance of the first application;
  comparing, by the computing system, the at least one metric to a corresponding benchmark derived from second application performance data collected during execution of one or more second applications at a second group of end user computing devices, each of the one or more second applications being different than the first application;
  determining whether the at least one metric is within a threshold amount of the corresponding benchmark;
  determining, based at least in part on determining that the at least one metric is not within the threshold amount of the corresponding benchmark, a fix for improving performance of the first application, wherein the fix includes one or more of a modification to source code of the first application or modification to a configuration file associated with the first application;
  outputting, by the computing system, for presentation at a developer device associated with the first application, an indication of the fix to the first application;
  receiving, from the developer device, an indication of user input that authorizes the fix to be automatically implemented by the computing system; and
  in response to receiving the indication of user input, automatically modifying, by the computing system, one or more of a portion of the source code of the first application or a portion of the configuration file associated with the first application, wherein automatically modifying the portion of the source code or the portion of the configuration file includes reducing startup time of the first application by at least automatically replacing one or more of an application programming interface with a different application programming interface, adjusting a start-up sequence of the first application to relocate an application programming interface call outside of the start-up sequence, or adjusting the start-up sequence of the first application to cause the application programming interface call to occur after other resources of the first application are loaded.

2. The method of claim 1, wherein each end user computing device from the first group of end user computing devices and the second group of end user computing devices executes a respective instance of a common computing platform.

3. The method of claim 1, wherein the first application and each of the one or more second applications are associated with a common category or genre of application.

4. The method of claim 3, wherein the first application and each of the one or more second applications are peer applications, and the first application differs from each of the one or more second applications by at least one of: a functionality, a title, or a developer.

5. The method of claim 1, wherein the fix to the first application further includes disabling one or more of a library, function call, or service utilized by the first application.

6. The method of claim 1, wherein the fix to the first application further includes replacing one or more of a first library, function call, or service utilized by the first application with one or more alternative libraries, function calls, or services.

7. The method of claim 1, wherein the first group of end user computing devices and the second group of end user computing devices comprise a single end user computing device.

8. A computing system comprising:
  at least one processor; and
  a computer-readable storage medium storing instructions that are executable by the at least one processor to:
    obtain first application performance data collected during execution of a first application at a first group of end user computing devices;
    determine, based on the first application performance data, at least one metric for quantifying performance of the first application;
    compare the at least one metric to a corresponding benchmark derived from second application performance data collected during execution of one or more second applications at a second group of end user computing devices, each of the one or more second applications being different than the first application;
    determine whether the at least one metric is within a threshold amount of the corresponding benchmark;
    determine, based at least in part on determining that the at least one metric is not within the threshold amount of the corresponding benchmark, a fix for improving performance of the first application, wherein the fix includes one or more of a modification to source code of the first application or modification to a configuration file associated with the first application;
    output for presentation at a developer device associated with the first application, an indication of the fix to the first application;
    receive, from the developer device, an indication of user input that authorizes the fix to be automatically implemented by the computing system; and
    in response to receiving the indication of user input, automatically modify one or more of a portion of the source code of the first application or a portion of the configuration file associated with the first application such that the modification of the portion of the source code or the portion of the configuration file reduces startup time of the first application and includes replacement of one or more of an application programming interface with a different application programming interface, adjustment of a start-up sequence of the first application to relocate an application programming interface call outside of the start-up sequence, or adjustment of the start-up sequence of the first application to cause the application programming interface call to occur after other resources of the first application are loaded.

9. The computing system of claim 8, wherein each computing device from the first group of end user computing devices and the second group of end user computing devices executes a respective instance of a common computing platform.

10. The computing system of claim 8, wherein the first application and each of the one or more second applications are associated with a common category or genre of application.

11. The computing system of claim 10, wherein the first application and each of the one or more second applications are peer applications, and the first application differs from each of the one or more second applications by at least one of: a functionality, a title, or a developer.

12. The computing system of claim 8, wherein the fix to the first application further includes disabling one or more of a library, function call, or service utilized by the first application.

13. The computing system of claim 8, wherein the fix to the first application further includes replacing one or more of a first library, function call, or service utilized by the first application with one or more alternative libraries, function calls, or services.

14. The computing system of claim 8, wherein the first group of end user computing devices and the second group of end user computing devices comprise a single end user computing device.

15. A non-transitory computer-readable storage medium storing instructions that, when executed, cause at least one processor to:
   obtain first application performance data collected during execution of a first application at a first group of end user computing devices;
   determine, based on the first application performance data, at least one metric for quantifying performance of the first application;
   compare the at least one metric to a corresponding benchmark derived from second application performance data collected during execution of one or more second applications at a second group of end user computing devices, each of the one or more second applications being different than the first application;
   determine whether the at least one metric is within a threshold amount of the corresponding benchmark;
   determine, based at least in part on determining that the at least one metric is not within the threshold amount of the corresponding benchmark, a fix for improving performance of the first application, wherein the fix includes one or more of a modification to source code of the first application or modification to a configuration file associated with the first application;
   output for presentation at a developer device associated with the first application, an indication of the fix to the first application;
   receive, from the developer device, an indication of user input that authorizes the fix to be automatically implemented; and
   in response to receiving the indication of user input, automatically modify one or more of a portion of the source code of the first application or a portion of the configuration file associated with the first application such that the modification of the portion of the source code or the portion of the configuration file reduces startup time of the first application and includes replacement of one or more of an application programming interface with a different application programming interface, adjustment of a start-up sequence of the first application to relocate an application programming interface call outside of the start-up sequence, or adjustment of the start-up sequence of the first application to cause the application programming interface call to occur after other resources of the first application are loaded.

16. The non-transitory computer-readable storage medium of claim 15, wherein the fix to the first application further includes disabling one or more of a library, function call, or service utilized by the first application.

17. The non-transitory computer-readable storage medium of claim 15, wherein the fix to the first application further includes replacing one or more of a first library, function call, or service utilized by the first application with one or more alternative libraries, function calls, or services.

* * * * *